US012802103B2

(12) United States Patent
Ham et al.

(10) Patent No.: US 12,802,103 B2
(45) Date of Patent: Nov. 17, 2026

(54) ADVERTISEMENT PERSONALIZATION METHOD AND APPARATUS

(71) Applicant: Samsung Electronics Co., Ltd., Suwon-si (KR)

(72) Inventors: Myungjoo Ham, Suwon-si (KR); Gichan Jang, Suwon-si (KR); Parichay Kapoor, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/796,475

(22) Filed: Aug. 7, 2024

(65) Prior Publication Data

US 2024/0394750 A1 Nov. 28, 2024

Related U.S. Application Data

(63) Continuation of application No. PCT/KR2023/001900, filed on Feb. 9, 2023.

(30) Foreign Application Priority Data

Feb. 15, 2022 (KR) ........................ 10-2022-0019787

(51) Int. Cl.
*G06Q 30/0251* (2023.01)

(52) U.S. Cl.
CPC ................................ *G06Q 30/0271* (2013.01)

(58) Field of Classification Search
CPC ............................................ G06Q 30/02–0277
See application file for complete search history.

(56) References Cited

U.S. PATENT DOCUMENTS

| | | | |
|---|---|---|---|
| 8,275,663 | B2 | 9/2012 | Rochford et al. |
| 2007/0050253 | A1 | 3/2007 | Biggs et al. |

(Continued)

FOREIGN PATENT DOCUMENTS

| | | | |
|---|---|---|---|
| CN | 104484817 | A | 4/2015 |
| CN | 107862552 | A | 8/2018 |

(Continued)

OTHER PUBLICATIONS

Goodman, Steve Neural Network Modeling: Artificial Intelligence Marketing hits the non-profit World, Fund Raising Management, 28 n4 p. 16(2). (Year: 1997).*

(Continued)

*Primary Examiner* — Raquel Alvarez
(74) *Attorney, Agent, or Firm* — STAAS & HALSEY LLP

(57) ABSTRACT

Disclosed is a client device for personalizing an advertisement, the client device including a memory storing instructions, and a processor, wherein the processor is configured to execute the instructions to obtain, through an advertisement personalization unit, activity information about a user related to the client device, based on an artificial intelligence learning model and the activity information, generate, through the advertisement personalization unit, a personalized advertisement query for the user, transmit, through the advertisement personalization unit, the advertisement query to an advertisement management server, receive, through the advertisement personalization unit, information about at least one advertisement corresponding to the advertisement query, from the advertisement management server, and provide, through the advertisement personalization unit, part or all of the information about the at least one advertisement, to an advertisement output unit.

18 Claims, 7 Drawing Sheets

(56) References Cited

U.S. PATENT DOCUMENTS

| | | | | |
|---|---|---|---|---|
| 2008/0109285 | A1* | 5/2008 | Reuther | G06Q 30/0242 707/999.005 |
| 2009/0198579 | A1 | 8/2009 | Lewis et al. | |
| 2018/0232775 | A1 | 8/2018 | Kim et al. | |
| 2019/0026760 | A1 | 1/2019 | Hwang et al. | |
| 2019/0066158 | A1 | 2/2019 | Choi et al. | |
| 2020/0220822 | A1 | 7/2020 | Cuzin et al. | |
| 2022/0156334 | A1* | 5/2022 | De Paolis | G06Q 30/02 |
| 2022/0353303 | A1 | 11/2022 | Lewis et al. | |
| 2023/0259975 | A1 | 8/2023 | Koo | |

FOREIGN PATENT DOCUMENTS

| | | |
|---|---|---|
| CN | 112734505 A | 4/2021 |
| JP | 2016-139198 | 8/2016 |
| KR | 10-2008-0043777 | 5/2008 |
| KR | 10-0832729 | 5/2008 |
| KR | 10-2010-0107521 | 10/2010 |
| KR | 10-2010-0118061 | 11/2010 |
| KR | 10-1040519 | 6/2011 |
| KR | 10-2017-0078769 | 7/2017 |
| KR | 10-2018-0093211 | 8/2018 |
| KR | 10-2019-0010173 | 1/2019 |
| KR | 10-2019-0024249 | 3/2019 |
| KR | 10-2019-0130261 | 11/2019 |
| KR | 10-2020-0012229 | 2/2020 |
| KR | 10-2020-0103137 | 9/2020 |
| KR | 10-2021-0155913 | 12/2021 |

OTHER PUBLICATIONS

International Search Report dated May 26, 2023 issued in PCT Application No. PCT/KR2023/001900.

Office Action dated Mar. 23, 2026, issued in Korean Application No. 10-2022-0019787.

* cited by examiner

ADVERTISEMENT PERSONALIZATION METHOD AND APPARATUS

CROSS-REFERENCE TO RELATED APPLICATIONS

This application is a continuation of International Application No. PCT/KR2023/001900, filed Feb. 9, 2023, and claims foreign priority to Korean Application No. 10-2022-0019787, filed Feb. 15, 2022, which are incorporated herein by reference in their entireties.

TECHNICAL FIELD

Various embodiments of the present disclosure relate to an advertisement personalization method and apparatus.

BACKGROUND ART

Technologies have been developed to provide personalized advertisements to users on consumer devices such as mobile phones, televisions, or family hubs. In general, an identifier, personal information, and activity information of a user are transmitted from a consumer device to a server for advertisement personalization, but because privacy protection issues have recently become more important, there is a movement to stop using user identifiers for advertisement personalization.

Meanwhile, an artificial intelligence (AI) system is a system in which a machine learns, performs determination on its own, and becomes smart, unlike existing rule-based smart systems. As AI systems are more frequently used, the recognition rates of AI systems are improving and users' preferences may be more accurately understood, and accordingly, the existing rule-based smart systems have gradually been replaced with deep-learning-based AI systems. AI technology includes machine learning (deep learning) and element technologies utilizing machine learning. Machine learning is an algorithm technology that classifies/learns features of input data by itself, and element technologies are to utilize machine learning algorithms such as deep learning, and cover technical fields such as linguistic understanding, visual understanding, inference/prediction, knowledge representation, operation control, and the like.

DISCLOSURE

Technical Problem

An embodiment of the present disclosure provides a client device for providing a personalized advertisement, and an operation method of the client device.

Technical Solution

An embodiment of the present disclosure may provide a client device for personalizing an advertisement, the client device including a memory storing instructions, and a processor configured to execute the instructions to obtain, through an advertisement personalization unit, activity information about a user related to the client device, generate, through the advertisement personalization unit, a personalized advertisement query for the user based on an artificial intelligence learning model and the activity information, transmit, through the advertisement personalization unit, the personalized advertisement query to an advertisement management server, receive, through the advertisement personalization unit, information about at least one advertisement corresponding to the advertisement query transmitted to the advertisement management server, from the advertisement management server, and provide, through the advertisement personalization unit, part or all of the information about the at least one advertisement, to an advertisement output unit.

In an embodiment, the artificial intelligence learning model may be included in the client device.

In an embodiment, the advertisement query may include properties of one or more advertisements.

In an embodiment, the information about the at least one advertisement may include at least one advertisement identifier, and the advertisement output unit may be configured to transmit the at least one advertisement identifier to an advertisement server, receive, from the advertisement server, at least one advertisement corresponding to the at least one advertisement identifier, and output the at least one advertisement to the user.

In an embodiment, the advertisement personalization unit may be configured to obtain the activity information about the user from a first application, and the advertisement output unit may be included in a second application that is different from the first application.

In an embodiment, the first application and the second application may be applications from different providers.

In an embodiment, the advertisement personalization unit may be included in an operating system (OS) of the client device.

In an embodiment, the advertisement personalization unit may be configured to obtain the activity information about the user from a first application, and the advertisement output unit may be included in a second application that is different from the first application.

In an embodiment, the advertisement personalization unit may be configured to obtain the activity information about the user from a first application, and the advertisement output unit may be included in the OS.

In an embodiment, the advertisement personalization unit may be included in a first application.

In an embodiment, the advertisement personalization unit may be configured to obtain the activity information about the user from a second application that is different from the first application, and the advertisement output unit may be included in a third application that is different from the first application and the second application.

In an embodiment, the advertisement personalization unit may be configured to obtain the activity information about the user from a second application that is different from the first application, and the advertisement output unit may be included in the first application.

In an embodiment, the information about the at least one advertisement may include an advertisement list including at least one advertisement identifier corresponding to the personalized advertisement query, and the advertisement personalization unit may be configured to select a first advertisement identifier from the advertisement list, and provide the first advertisement identifier to the advertisement output unit.

In an embodiment, the advertisement personalization unit may be further configured to obtain information about the user, and select the first advertisement identifier from the advertisement list based on the information about the user.

In an embodiment, the advertisement output unit may be configured to transmit the first advertisement identifier to an advertisement server, receive an advertisement corresponding to the first advertisement identifier from the advertisement server, and output the advertisement to the user.

In an embodiment, the information about the at least one advertisement may include an advertisement list including at least one advertisement identifier corresponding to the personalized advertisement query, and the advertisement personalization unit may be configured to provide the advertisement list to the advertisement output unit.

In an embodiment, the advertisement output unit may be configured to select a first advertisement identifier from the advertisement list, transmit the first advertisement identifier to an advertisement server, receive an advertisement corresponding to the first advertisement identifier from the advertisement server, and output the advertisement to the user.

In an embodiment, the artificial intelligence learning model may include a reinforcement learning agent, an action of the reinforcement learning agent may be based on the at least one advertisement, and a reward of the reinforcement learning agent may be based on a response of the user to the at least one advertisement.

An embodiment of the present disclosure may provide an operation method of a client device for personalizing an advertisement, the operation method including obtaining, through an advertisement personalization unit, activity information about a user related to the client device, generating, through the advertisement personalization unit, a personalized advertisement query for the user based on an artificial intelligence learning model and the activity information, transmitting, through the advertisement personalization unit, the personalized advertisement query to an advertisement management server, receiving, through the advertisement personalization unit, information about at least one advertisement corresponding to the personalized advertisement query transmitted to the advertisement management server, from the advertisement management server, and providing, through the advertisement personalization unit, part or all of the information about the at least one advertisement, to an advertisement output unit.

An embodiment of the present disclosure includes non-transitory computer-readable recording medium having recorded thereon a program that is executable by a processor to perform an operation method according to an embodiment of the present disclosure.

An embodiment of the present disclosure includes a computer-readable recording medium having recorded thereon a program for causing a computer to execute the method according to an embodiment of the present disclosure.

MODE FOR INVENTION

Figure 1:
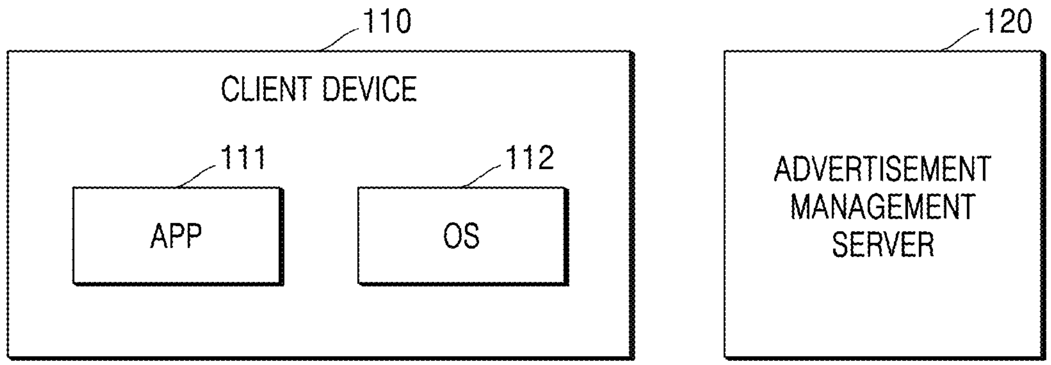
FIG. 1 is a block diagram schematically illustrating a configuration of an advertisement personalization system according to an embodiment of the present disclosure.

Hereinafter, embodiments of the present disclosure will be described in detail with reference to the accompanying drawings in order to clarify the technical idea of the present disclosure. In describing the present disclosure, detailed description of related well-known functions or configurations may be omitted when it is deemed that they may unnecessarily obscure the essence of the present disclosure. Components having substantially the same functional configuration in the drawings are assigned the same reference numerals and reference characters as possible even though they are indicated on different drawings. When necessary for convenience of description, a device and a method will be described together. Operations of the present disclosure do not need to be performed in the order described herein, and may be performed in parallel, selectively, or individually.

FIG. 1 is a block diagram schematically illustrating a configuration of an advertisement personalization system according to an embodiment of the present disclosure. Referring to FIG. 1, an advertisement personalization system according to an embodiment of the present disclosure may include a client device 110 and an advertisement management server 120. The client device 110 may include an operating system (OS) 112 and an application 111. The application 111 may request, from the OS 112, an advertisement identifier (ID) for identifying a user in order to output a personalized advertisement. The OS 112 may provide the advertisement ID to the application 111. The application 111 may transmit, to the advertisement management server 120, information about an activity of the user, along with the advertisement ID.

The activity of the user refers to an activity of the user related to a client device. The activity of the user may include an action that the user performs by using the client device. The activity of the user may include a response of the user to an output advertisement. For example, activity information about the user may include advertisement inquiring/ignoring/removal information, advertisement viewing time information, advertisement inquiring time information, and feedback information about an advertisement. The activity information about the user may include app usage information about the user. For example, the activity information about the user may include app execution information, Internet search information, media viewing information, product purchase information, service use information, phone call information, message information associated with a messenger or a social network service, and the like. The activity information about the user may include context information collected by the client device using various sensors, communication units, connectors, timers, and the like. For example, the activity information about the user may include time information, location information of the client device, movement information of the client device, information about the brightness or a sound around the client device, information about devices around the client device, and the like.

The advertisement management server 120 may analyze and store the activity information about the user for the corresponding advertisement ID. The application 111 may transmit an advertisement request along with an advertisement ID, to the advertisement management server 120. The advertisement management server 120 may select a personalized advertisement for the user based on the activity information of the user for the advertisement ID. The advertisement management server 120 may transmit the selected advertisement to the application 111. The application 111 may output the received advertisement to the user. According to an embodiment, the advertisement management server 120 may transmit an ID of the selected advertisement to the application 111. The application 111 may receive an advertisement from the advertisement management server 120 or a separate advertisement server, based on the received advertisement ID, and output the received advertisement to the user. According to an embodiment, the application 111 may communicate with the advertisement management server 120 or the advertisement server via the OS 112, rather than directly communicating with them.

In an embodiment, the application 111 may not use the advertisement ID provided by the OS 112. The application 111 may transmit information about an activity of the user to the advertisement management server 120 without an advertisement ID. Because the advertisement management server 120 cannot identify individuals, it may analyze and store user activities for all users. When the application 111 transmits an advertisement request to the advertisement management server 120, the advertisement management server 120 may transmit an unpersonalized advertisement to the application 111. According to an embodiment, the advertisement management server 120 may analyze and store activities of users by region based on the address of the client device 110. When the application 111 transmits an advertisement request to the advertisement management server 120, the advertisement management server 120 may transmit an advertisement for each region according to the address of the client device 110. When the application 111 performs user login, a personalized advertisement may be provided to the user even when the advertisement ID provided by the OS 112 is not used.

Figure 2:
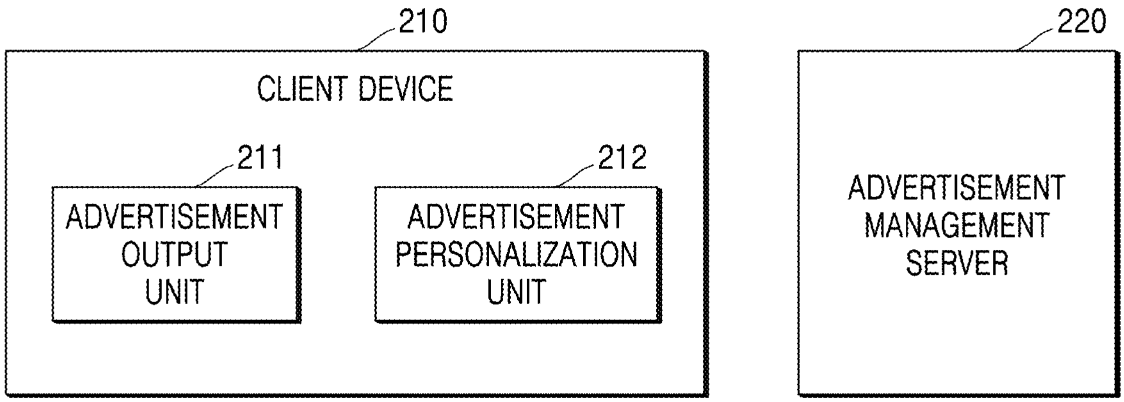
FIG. 2 is a block diagram schematically illustrating a configuration of an advertisement personalization system according to an embodiment of the present disclosure.

FIG. 2 is a block diagram schematically illustrating a configuration of an advertisement personalization system according to an embodiment of the present disclosure. Some or all of the blocks illustrated in FIG. 2 may be implemented by hardware and/or software elements that perform particular functions. The functions performed by the blocks illustrated in FIG. 2 may be implemented by one or more microprocessors or by circuit elements for the corresponding functions. Some or all of the blocks illustrated in FIG. 2 may be software modules configured in various programming languages or script languages executable by a processor.

Referring to FIG. 2, an advertisement personalization system according to an embodiment of the present disclosure may include a client device 210 and an advertisement management server 220. The client device 210 may include an advertisement personalization unit 212 and an advertisement output unit 211. At least one of the advertisement personalization unit 212 and the advertisement output unit 211 may be implemented as a software module. In a case in which at least one of the advertisement personalization unit 212 and the advertisement output unit 211 is implemented as a software module (e.g., a program module including instructions), the software module may be stored in a non-transitory computer-readable recording medium. In addition, in this case, the at least one software module may be provided by an OS or a certain application. Alternatively, part of the at least one software module may be provided by an OS, and the other part may be provided by a certain application. The advertisement management server 220 may be a cloud server.

The advertisement personalization unit 212 may obtain activity information about a user related to the client device 210. The activity information about the user is the same as described above. The advertisement personalization unit 212 may obtain the activity information about the user from the OS of the client device 210. The advertisement personalization unit 212 may obtain the activity information about the user from at least one application installed on the client device 210. The advertisement personalization unit 212 may directly collect the activity information about the user. The advertisement personalization unit 212 may obtain the activity information about the user according to a request from the advertisement output unit 211. The advertisement personalization unit 212 may obtain the activity information about the user regardless of the advertisement output unit 211.

The advertisement personalization unit 212 may generate a personalized advertisement query for the user, based on the activity information about the user. The personalized advertisement query for the user is a query for obtaining a personalized advertisement for the user from the advertisement management server 220. An advertisement query may include one or more advertisement properties. The advertisement properties may include product or service category information, region or location information, brand information, price information, consumer review information (e.g., the amount of reviews, positive/negative levels of review content, or particular keywords in review content), and the like. For example, in a case in which the user is mainly active in Songpa District, frequently watches YouTube and searches the Internet about BMW cars, and talks a lot with family members about the cars, the advertisement personalization unit 212 may generate an advertisement query containing a product category of "car", a brand of "BMW", and region information of "Songpa District", in order to obtain advertisements about BMW dealerships in Songpa District. The advertisement query may include a structured search expression or a general syntax search expression.

The advertisement personalization unit 212 may transmit an advertisement query to the advertisement management server 220, and receive information about at least one advertisement corresponding to the advertisement query, from the advertisement management server 220. The information about the at least one advertisement corresponding to the advertisement query may include an advertisement ID corresponding to the advertisement query, an advertisement list including at least one advertisement ID corresponding to the advertisement query, or an advertisement itself corresponding to the advertisement query. The advertisement personalization unit 212 may provide the advertisement output unit 211 with part or all of information about at least one received advertisement.

When the information about the advertisement is an advertisement itself corresponding to the advertisement query, the advertisement output unit 211 may receive the advertisement from the advertisement personalization unit 212 and output it to the user. When the information about the advertisement is an advertisement ID corresponding to the advertisement query, the advertisement output unit 211 may receive the advertisement ID from the advertisement personalization unit 212, transmit it to an advertisement server, receive an advertisement corresponding to the advertisement ID from the advertisement server, and output the received advertisement to the user. The advertisement server may be the same as or different from the advertisement management server 220. The advertisement server and the advertisement management server 220 may be operated by the same business operator or different business operators.

When the information about the advertisement is an advertisement list including at least one advertisement ID corresponding to the advertisement query, the advertisement personalization unit 212 may select one advertisement ID from the advertisement list, and provide the selected advertisement ID to the advertisement output unit 211. The advertisement output unit 211 may transmit the received advertisement ID to the advertisement server, receive an advertisement corresponding to the advertisement ID from the advertisement server, and output the received advertisement to the user. The advertisement personalization unit 212 may obtain information about the user and select an advertisement ID from the advertisement list based on the information about the user. The information about the user may include the user's address, age, gender, body size, occupation, preferences, and the like. The advertisement personalization unit 212 may directly obtain the information about the user, receive it from an OS, or receive it from an application.

According to an embodiment, when the information about the advertisement is an advertisement list, the advertisement personalization unit 212 may provide the advertisement list to the advertisement output unit 211. The advertisement output unit 211 may select one advertisement ID from the advertisement list, transmit the selected advertisement ID to the advertisement server, receive an advertisement corresponding to the advertisement ID from the advertisement server, and output the received advertisement to the user.

The advertisement personalization unit 212 may generate a personalized advertisement query for the user based on an artificial intelligence learning model. The advertisement personalization unit 212 may generate an advertisement query by using activity information about the user as input to the artificial intelligence learning model. Here, the artificial intelligence learning model is mounted on the client device 210 for an on-device AI function. Thus, the advertisement personalization unit 212 may achieve the effect of personalizing an advertisement without transmitting the activity information about the user to the outside of the client device 210. In addition, because the activity information about the user is not leaked to the outside, more diverse and in-depth activity information about the user may be used for advertisement personalization. For example, by using only information that the user has recently performed a lot of searches for rental cars, a rental car advertisement may be output even after the user has already reserved a rental car, whereas, by further using information that the user has already reserved a rental car, it is possible to prevent rental car advertisements from being output anymore or to output other advertisements related to the reservation.

An input feature map of a neural network of the artificial intelligence learning model may include information about actions and requests of the user and/or the application. The input feature map may include properties of an output advertisement, and a response of the user to the output advertisement. The output advertisement corresponds to an action of the artificial intelligence learning model, and the response of the user to the output advertisement may correspond to a reward for the action. The neural network of the artificial intelligence learning model may include a reinforcement learning agent that uses other input feature maps as observations of environments. Here, the reward may be set to increase when the user shows more active interest in the output advertisement, so as to maximize the profitability of the next output advertisement.

The input feature map may include an accumulated user activity information history. The accumulated activity information history may include the time of a corresponding activity, the location of the activity, and activities immediately before/after the activity. The accumulated activity information history may serve as an environment for providing an observation to the artificial intelligence learning model. In order to provide a large amount of accumulated activity information histories to the neural network, a recurrent neural network technique may be applied to input all existing activity information one by one. Here, a weight may be applied to ensure that recent information has more influence.

The output feature map of the neural network of the artificial intelligence learning model may include properties of advertisements necessary to generate a query necessary to select an appropriate advertisement. When the output feature map includes various properties, an inference result may include a confidence level or a probability to indicate that some of the properties are irrelevant or have low relevance. For example, when the confidence level for region information is 0, it may indicate that the region is irrelevant, and when the confidence level for brand information is 1, it may indicate that the brand is definitely relevant.

The output feature map may be used to generate a general text query by using a query generation deep neural network technique, so as to provide a search expression flexibly depending on the situation. Here, the query may be in the form of a general syntax search expression rather than a structured search expression. The general syntax search expression may be similar to a search expression for Google Search.

An example of a structured search expression is as follows:

"Title: ABC AND DEF/Content: KEYWORD1 or KEYWORD2/Date: 2019-2021"

An example of a general syntax search expression is as follows:

"ABD DEF KEYWORD1 KEYWORD2 FROM 2019 TO 2021"

Figure 3:
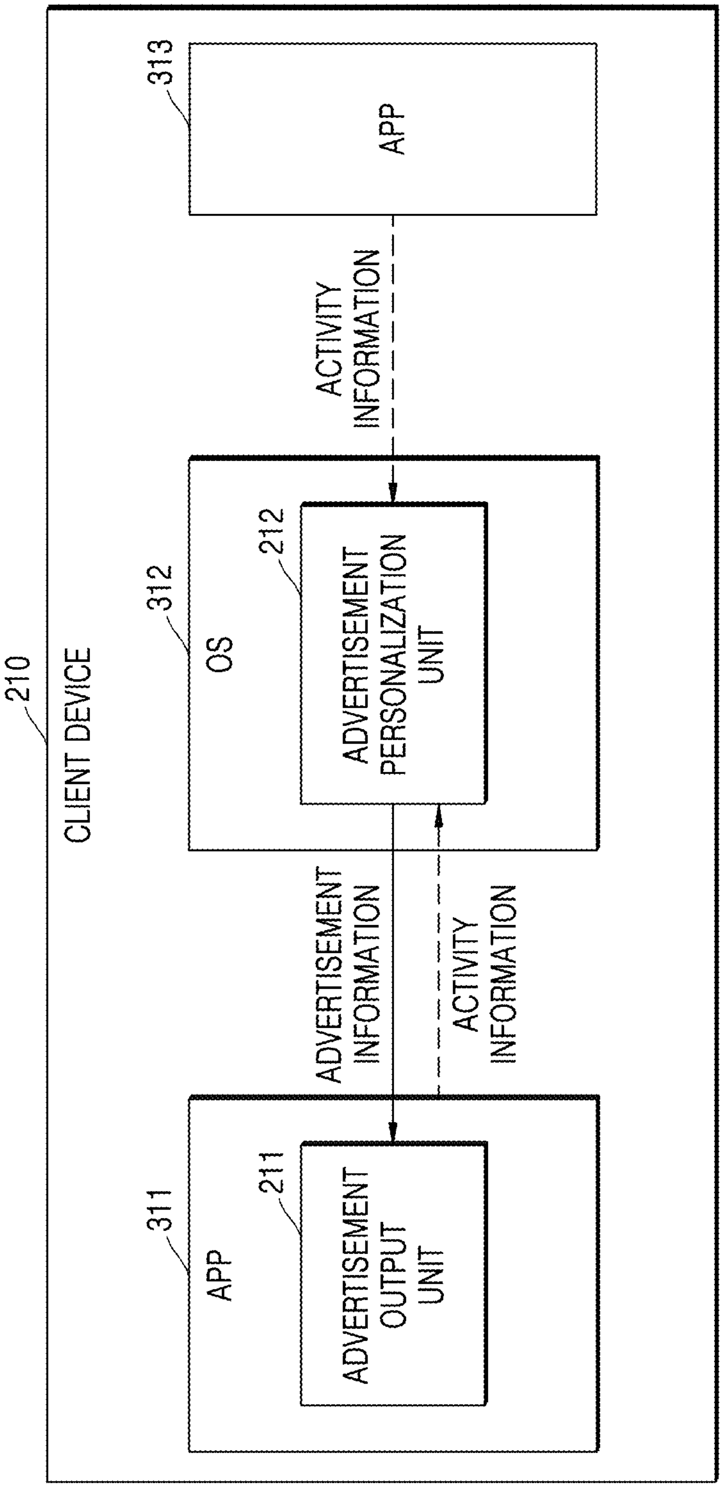
FIG. 3 is a block diagram schematically illustrating a configuration of a client device according to an embodiment of the present disclosure.

FIG. 3 is a block diagram schematically illustrating a configuration of a client device according to an embodiment of the present disclosure. Referring to FIG. 3, the advertisement personalization unit 212 may be included in an OS 312 of the client device 210, and the advertisement output unit 211 may be included in an application 311 installed on the client device 210. The advertisement personalization unit 212 may obtain activity information about a user, inside the OS 312. That is, the advertisement personalization unit 212 may receive the activity information about the user from an internal component of the OS 312. The advertisement personalization unit 212 may receive the activity information about the user from the application 311 or from an application 313 that is different from the application 311. The application 311 and the application 313 may be applications from the same provider, or may be applications from different providers. Of course, the advertisement personalization unit 212 may also receive the activity information about the user from a plurality of applications. According to the present disclosure, a personalized advertisement may be output from the application 311 that is different from the application 313, based on the activity information about the user obtained from the application 313. For example, when the user clicks on an advertisement for "AMG CLA45S" in a game app, chats about "circuit" in a messaging app, and searches for "Everland" in a web browser app, a personalized advertisement related to "AMG Yong-in Circuit Event" may be displayed in a social networking app, which is a separate application, based on activities of the user through these various applications. At this time, the user does not need to log in to the applications.

Figure 4:
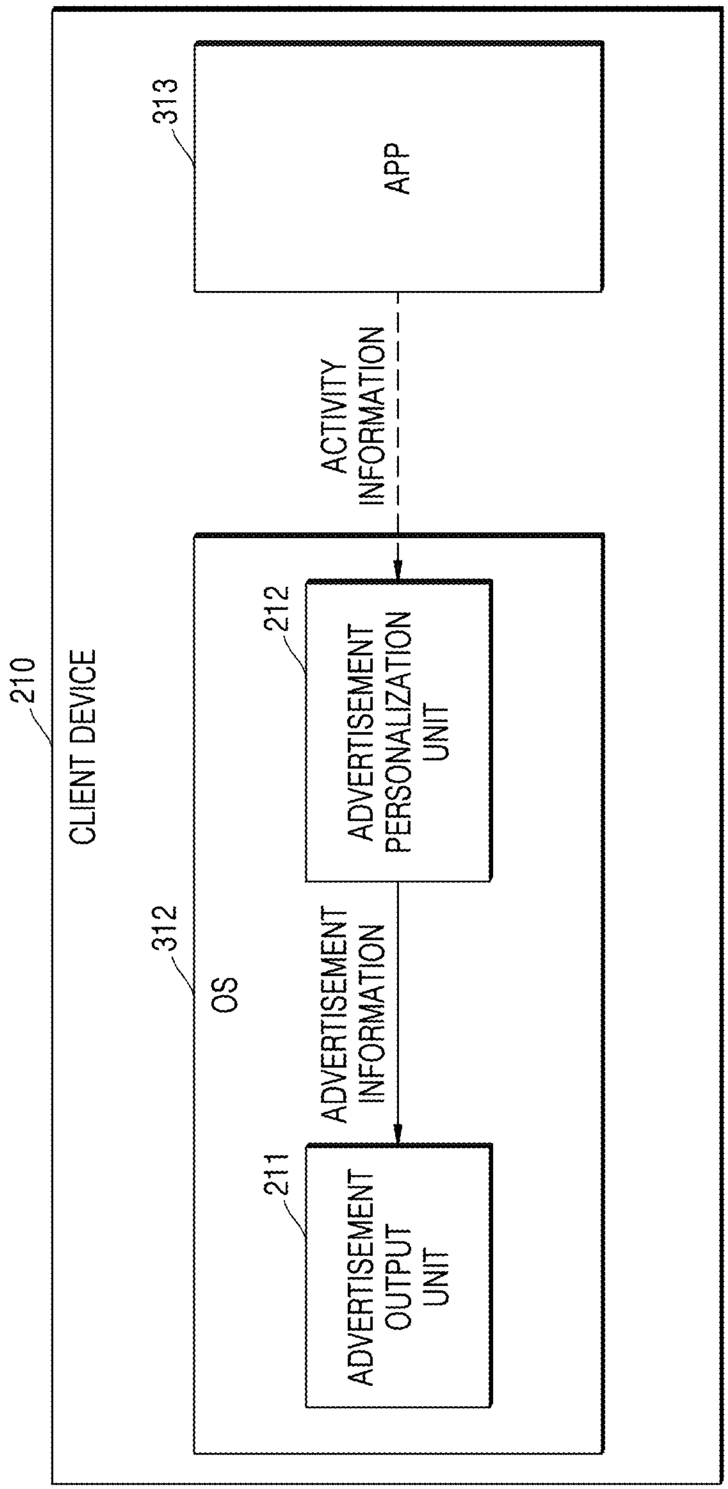
FIG. 4 is a block diagram schematically illustrating a configuration of a client device according to an embodiment of the present disclosure.

FIG. 4 is a block diagram schematically illustrating a configuration of a client device according to an embodiment of the present disclosure. Referring to FIG. 4, unlike FIG. 3, the advertisement output unit 211 is included in the OS 312. That is, the OS 312 may output a personalized advertisement to a user.

Figure 5:
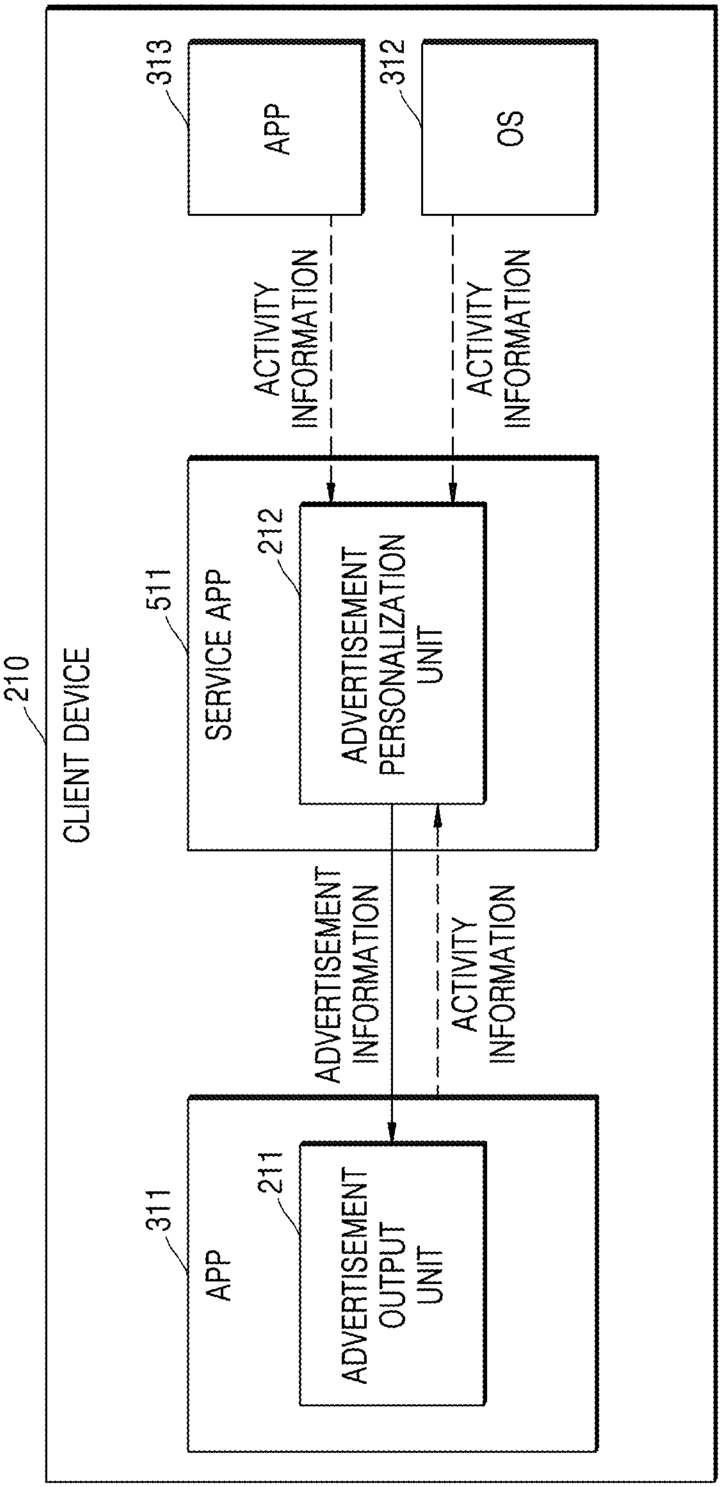
FIG. 5 is a block diagram schematically illustrating a configuration of a client device according to an embodiment of the present disclosure.

FIG. 5 is a block diagram schematically illustrating a configuration of a client device according to an embodiment of the present disclosure. Referring to FIG. 5, unlike FIG. 3, the advertisement personalization unit 212 is included in a service application 511. That is, the advertisement personalization unit 212 may provide app services to other applications. Different applications 311 and 313 use an advertisement personalization service provided by the separate service application 511, enabling output of a personalized advertisement to the same level as in the embodiment of FIG. 3. The advertisement personalization unit 212 included in the application 511 may receive user activity information from the OS 312.

Figure 6:
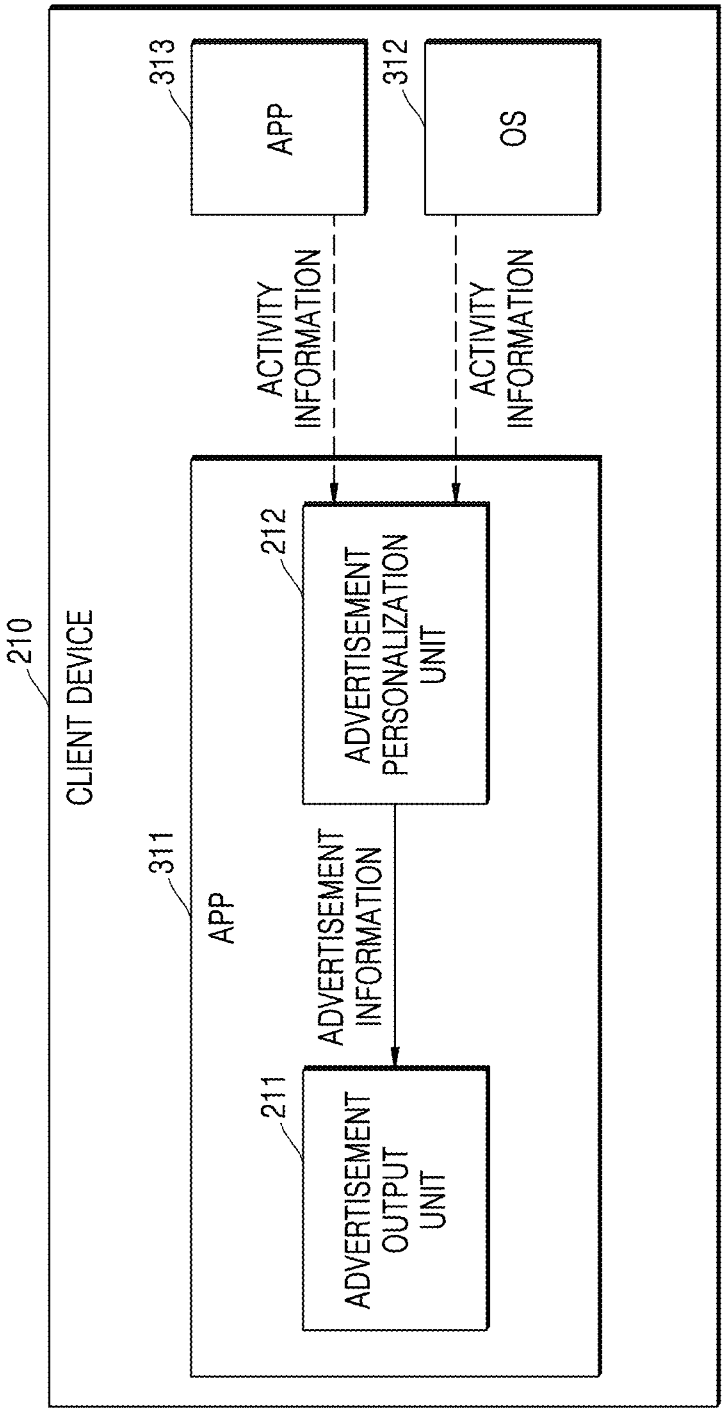
FIG. 6 is a block diagram schematically illustrating a configuration of a client device according to an embodiment of the present disclosure.

FIG. 6 is a block diagram schematically illustrating a configuration of a client device according to an embodiment of the present disclosure. Referring to FIG. 6, unlike FIG. 5, the advertisement output unit 211 and the advertisement personalization unit 212 are included in the same application 311. The advertisement personalization unit 212 included in the application 311 may obtain user activity information, inside the application 311 or from the OS 312. In a case in which the application 313 is designed to be compatible with the application 311, the advertisement personalization unit 212 may receive user activity information from the application 313. This is a useful embodiment particularly when the application 311 and the application 313 are from the same provider.

Figure 7:
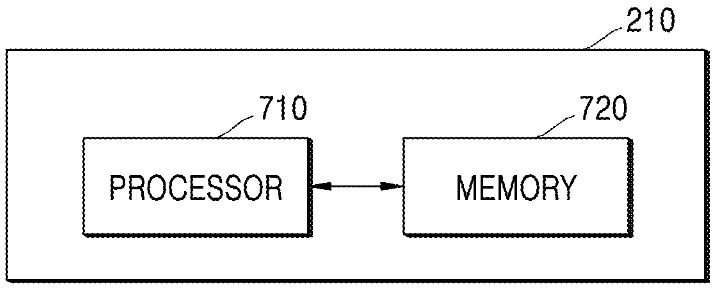
FIG. 7 is a block diagram schematically illustrating a configuration of a client device according to an embodiment of the present disclosure.

FIG. 7 is a block diagram schematically illustrating a configuration of a client device according to an embodiment of the present disclosure. Referring to FIG. 7, the client device 210 according to an embodiment of the present disclosure may include a processor 710 and a memory 720 storing one or more instructions that are executable by the processor 710. The processor 710 may be one processor or may include a plurality of processors. The memory 720 may be one memory or may include a plurality of memories. The processor 710 may execute one or more instructions stored in the memory 720 to perform the operations of the advertisement personalization unit 212 and/or the advertisement output unit 211 described above.

For example, the processor 710 may obtain, through the advertisement personalization unit 212, activity information about a user related to the client device 210, generate, through the advertisement personalization unit 212, a personalized advertisement query for the user based on an artificial intelligence learning model and the activity information about the user, transmit, through the advertisement personalization unit 212, the advertisement query to an advertisement management server, receive, through the advertisement personalization unit 212, information about at least one advertisement corresponding to the advertisement query from the advertisement management server, and provide, through the advertisement personalization unit 212, part or all of the information about the at least one advertisement to the advertisement output unit 211.

The artificial intelligence learning model may be included in the client device 210. The artificial intelligence learning model may include a reinforcement learning agent. An action of the reinforcement learning agent may be based on at least one advertisement, and a reward of the reinforcement learning agent may be based on a response of the user to the at least one advertisement. The action of the reinforcement learning agent may be based on an advertisement output by the advertisement output unit 211, and the reward of the reinforcement learning agent may be based on a response of the user to the advertisement output by the advertisement output unit 211.

Figure 8:
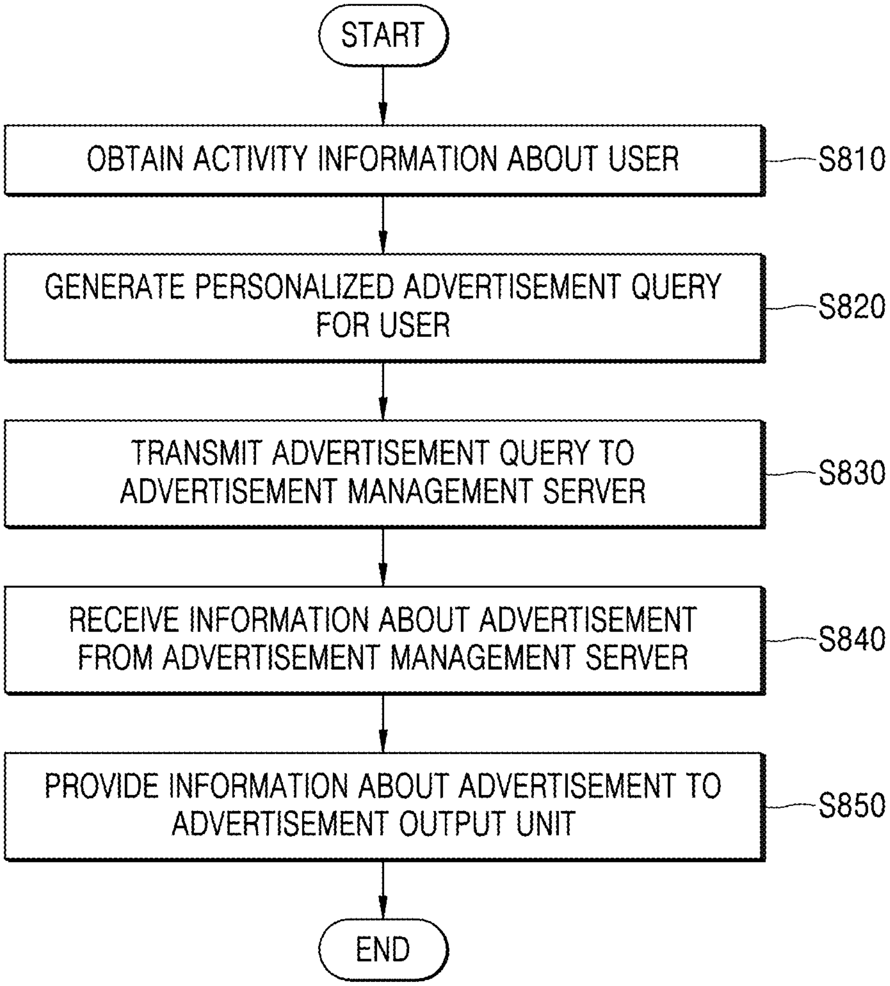
FIG. 8 is a flowchart schematically illustrating the flow of an operation method of a client device according to an embodiment of the present disclosure.

FIG. 8 is a flowchart schematically illustrating the flow of an operation method of a client device according to an embodiment of the present disclosure. Referring to FIG. 8, the processor 710 of the client device 210 may, in operation S810, obtain, through the advertisement personalization unit 212, activity information about a user related to the client device 210, in operation S820, generate, through the advertisement personalization unit 212, a personalized advertisement query for the user based on an artificial intelligence learning model and the activity information about the user, in operation S830, transmit, through the advertisement personalization unit 212, the advertisement query to an advertisement management server, in operation S840, receive, through the advertisement personalization unit 212, information about at least one advertisement corresponding to the advertisement query from the advertisement management server, and in operation S850, provide, through the advertisement personalization unit 212, part or all of the information about the at least one advertisement to the advertisement output unit 211.

The embodiments of the present disclosure may be implemented as code executable by a computer, which is recorded on a computer-readable recording medium. The computer-readable recording medium includes all recording media such as magnetic media, optical media, read-only memory (ROM), or random-access memory (RAM). The computer-readable recording medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the 'non-transitory storage medium' may include a buffer in which data is temporarily stored.

According to an embodiment, methods according to various embodiments disclosed herein may be included in a computer program product and then provided. The computer program product may be traded as commodities between sellers and buyers. The computer program product may be stored in a computer-readable recording medium and then distributed, or may be distributed online (e.g., downloaded or uploaded) through an application store (e.g., Play Store™) or directly between two user devices (e.g., smart phones). In a case of online distribution, at least part of the computer program product (e.g., a downloadable app) may be temporarily stored or temporarily generated in a computer-readable recording medium such as a manufacturer's server, an application store's server, or a memory of a relay server.

The present disclosure has been described in detail, focusing on preferred embodiments illustrated in the drawings.

The embodiments are only illustrative without limiting the present disclosure and should be understood in the illustrative sense only and not for the purpose of limitation. It will be understood by those of skill in the art to which the present disclosure belongs that various changes in form and details may be made in the embodiments without changing the technical spirit and mandatory features of the present disclosure. For example, each component described as a single type may be carried out by being distributed, and likewise, components described as a distributed type may also be carried out by being coupled. All features and/or operations of the present disclosure, including in the claims and drawings, may be combined in any combination unless at least some of the features and/or operations contradict each other. Although particular terms are used in the specification, the terms are for the purpose of describing the present disclosure only and are not intended to be limiting of the meaning or the scope of the present disclosure as defined by the claims.

The true technical protection scope of the present disclosure is defined by the claims below rather than the above detailed description, and should be construed that all modifications or modified forms derived from the meaning and scope of the claims and their equivalents are included in the scope of the present disclosure. It should be understood that equivalents include not only currently known equivalents but also equivalents to be developed in the future, that is, all components disclosed to perform the same functions regardless of a structure.

The invention claimed is:

1. A client device comprising:

an operating system (OS) installed on the client device;

a first application installed on the client device;

a second application installed on the client device;

an artificial intelligence learning model having an input feature map that includes an accumulated user activity information history and an output feature map that includes properties of advertisements for generating a personal advertisement query to select an advertisement;

an advertisement personalization unit configured to obtain activity information about a user of the client device from the first application or the OS, and to input the activity information about the user to the artificial intelligence learning model to generate a personalized advertisement query for the user;

an advertisement output unit configured to output an advertisement;

a memory storing instructions; and a processor configured to execute the instructions to:

transmit the personalized advertisement query for the user generated by the advertisement personalization unit to an advertisement management server that is external to the client device, without transmitting the activity information about the user outside of the client device, receive, from the advertisement management server, information about at least one advertisement corresponding to the personalized advertisement query that was transmitted to the advertisement management server, and output, by the advertisement output unit, an advertisement based on the information about the at least one advertisement received from the advertisement management server such that the outputted advertisement is displayed by the second application on the client device, wherein the artificial intelligence learning model includes a reinforcement learning agent, an action of the reinforcement learning agent is based on the at least one advertisement and a reward of the reinforcement learning agent is based on a response of the user to the at least one advertisement.

2. The client device of claim 1, the personalized advertisement query includes properties of one or more advertisements.

3. The client device of claim 1, wherein the information about the at least one advertisement includes at least one advertisement identifier, and the advertisement output unit is configured to:

transmit the at least one advertisement identifier to an advertisement server, receive, from the advertisement server, at least one advertisement corresponding to the at least one advertisement identifier, and output the at least one advertisement.

4. The client device of claim 1, wherein the advertisement personalization unit is configured to obtain the activity information about the user from the first application, and the advertisement output unit is included in the second application.

5. The client device of claim 4, wherein the first application and the second application are applications from different providers.

6. The client device of claim 1, wherein the advertisement personalization unit is included in the OS.

7. The client device of claim 6, wherein the advertisement personalization unit is configured to obtain the activity information about the user from the first application, and the advertisement output unit is included in the second application.

8. The client device of claim 6, wherein the advertisement personalization unit is configured to obtain the activity information about the user from the first application, and the advertisement output unit is included in the OS.

9. The client device of claim 1, wherein the advertisement personalization unit is included in the first application.

10. The client device of claim 9, further comprising:

a third application installed on the client device, wherein the advertisement output unit is included in the third application.

11. The client device of claim 9, wherein the advertisement output unit is included in the first application.

12. The client device of claim 1, wherein the information about the at least one advertisement includes an advertisement list including at least one advertisement identifier corresponding to the personalized advertisement query, and the advertisement personalization unit is configured to select a first advertisement identifier from the advertisement list, and provide the first advertisement identifier to the advertisement output unit.

13. The client device of claim 12, wherein the advertisement personalization unit is further configured to obtain information about the user, and based on the information about the user, select the first advertisement identifier from the advertisement list.

14. The client device of claim 12, wherein the advertisement output unit is configured to transmit the first advertisement identifier to an advertisement server, receive an advertisement corresponding to the first advertisement identifier from the advertisement server, and output the advertisement.

15. The client device of claim 1, wherein the information about the at least one advertisement includes an advertisement list including at least one advertisement identifier corresponding to the personalized advertisement query, and the advertisement personalization unit is configured to provide the advertisement list to the advertisement output unit.

16. The client device of claim 15, wherein the advertisement output unit is configured to select a first advertisement identifier from the advertisement list, transmit the first advertisement identifier to an advertisement server, receive an advertisement corresponding to the first advertisement identifier from the advertisement server, and output the advertisement.

17. A method comprising:

by a client device that includes an operating system (OS) installed on the client device, a first application installed on the client device, a second application installed on the client device, and an artificial intelligence learning model including a reinforcement learning agent and having an input feature map that includes an accumulated user activity information history and an output feature map that includes properties of advertisements for generating a personal advertisement query to select an advertisement:

obtaining activity information about a user of the client device from the first application or the OS;

inputting the activity information about the user to the artificial intelligence learning model to generate a personalized advertisement query for the user;

transmitting the personalized advertisement query for the user to an advertisement management server that is external to the client device, without transmitting the activity information of the user outside of the client device;

receiving, from the advertisement management server, information about at least one advertisement corresponding to the personalized advertisement query that was transmitted to the advertisement management server; and outputting an advertisement based on the information about the at least one advertisement received from the advertisement management server such that the outputted advertisement is displayed by the second application on the client device, wherein an action of the reinforcement learning agent is based on the at least one advertisement, and a reward of the reinforcement learning agent is based on a response of the user to the at least one advertisement.

18. A non-transitory computer-readable recording medium having recorded thereon a program that is executable by a processor to perform the method of claim 17.

* * * * *